(12) United States Patent
Lightowler et al.

(10) Patent No.: US 11,822,467 B2
(45) Date of Patent: *Nov. 21, 2023

(54) CONDUCTING SOFTWARE TESTING USING DYNAMICALLY MASKED DATA

(71) Applicant: Bank of America Corporation, Charlotte, NC (US)

(72) Inventors: Ben Lightowler, Sandhurst (GB); David Mortman, Worthington, OH (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,854

(22) Filed: Apr. 5, 2022

(65) Prior Publication Data

US 2022/0229770 A1 Jul. 21, 2022

Related U.S. Application Data

(63) Continuation of application No. 17/068,257, filed on Oct. 12, 2020, now Pat. No. 11,354,227.

(51) Int. Cl.
*G06F 11/36* (2006.01)
*G06F 21/60* (2013.01)
*G06F 21/62* (2013.01)

(52) U.S. Cl.
CPC ...... *G06F 11/3688* (2013.01); *G06F 11/3664* (2013.01); *G06F 21/602* (2013.01); *G06F 21/6218* (2013.01)

(58) Field of Classification Search
CPC ............ G06F 11/3688; G06F 11/3664; G06F 21/602; G06F 21/6218; G06F 11/3692; G06F 21/6245

See application file for complete search history.

(56) References Cited

U.S. PATENT DOCUMENTS

| 6,842,866 B2 | 1/2005 | Song et al. |
| 7,917,770 B2 | 3/2011 | Gopinath et al. |
| 8,000,928 B2 | 8/2011 | Scott et al. |

(Continued)

*Primary Examiner* — Daxin Wu
(74) *Attorney, Agent, or Firm* — Banner & Witcoff, Ltd.

(57) ABSTRACT

Aspects of the disclosure relate to conducting software testing using dynamically masked data. In some embodiments, a computing platform may receive, from a developer computing platform, a test execution request that includes a test code for execution. Subsequently, the computing platform may establish a secure connection to an enterprise data storage database. Upon establishing the secure connection, the computing platform may request confidential data from the enterprise data storage database in connection the test execution request. Thereafter, the computing platform mat execute the test code, which may include receiving encrypted confidential data from the enterprise data storage, decrypting the confidential data, and plugging the confidential data into the test code. Upon completing execution of the test code, the computing platform may delete the confidential data from the computing platform, terminate the secure connection to the enterprise data storage database, and send test code output results to the developer computing platform.

20 Claims, 10 Drawing Sheets

(56) References Cited

U.S. PATENT DOCUMENTS

| | | |
|---|---|---|
| 8,112,742 B2 | 2/2012 | Russell |
| 8,209,549 B1 | 6/2012 | Bain, III |
| 8,707,058 B1 | 4/2014 | Bain |
| 8,805,951 B1* | 8/2014 | Faibish ............... G06F 21/6218 |
| | | 718/1 |
| 8,862,999 B2 | 10/2014 | Gupta et al. |
| 10,467,220 B2 | 11/2019 | Li et al. |
| 10,685,139 B2 | 6/2020 | Harp |
| 10,983,903 B1* | 4/2021 | Yawalkar ................ H04L 43/50 |
| 2002/0001281 A1 | 1/2002 | Kitaura et al. |
| 2007/0136237 A1* | 6/2007 | Barker ................ G06F 21/6227 |
| 2007/0156850 A1* | 7/2007 | Corrion ................... G06F 21/78 |
| | | 709/219 |
| 2008/0133934 A1* | 6/2008 | Gopinath ............ G06F 11/3672 |
| | | 713/189 |
| 2009/0132575 A1* | 5/2009 | Kroeschel ........... G06F 21/6254 |
| | | 707/E17.037 |
| 2011/0010720 A1 | 1/2011 | Smith et al. |
| 2012/0272329 A1* | 10/2012 | Grammer ............ G06F 21/6245 |
| | | 726/26 |
| 2014/0164405 A1 | 6/2014 | Tsai et al. |
| 2017/0323119 A1* | 11/2017 | Harp ................... G06F 21/6254 |
| 2019/0362083 A1* | 11/2019 | Ortiz .................... H04L 9/3247 |
| 2020/0364133 A1* | 11/2020 | Vidal ................. G06F 9/45558 |

* cited by examiner

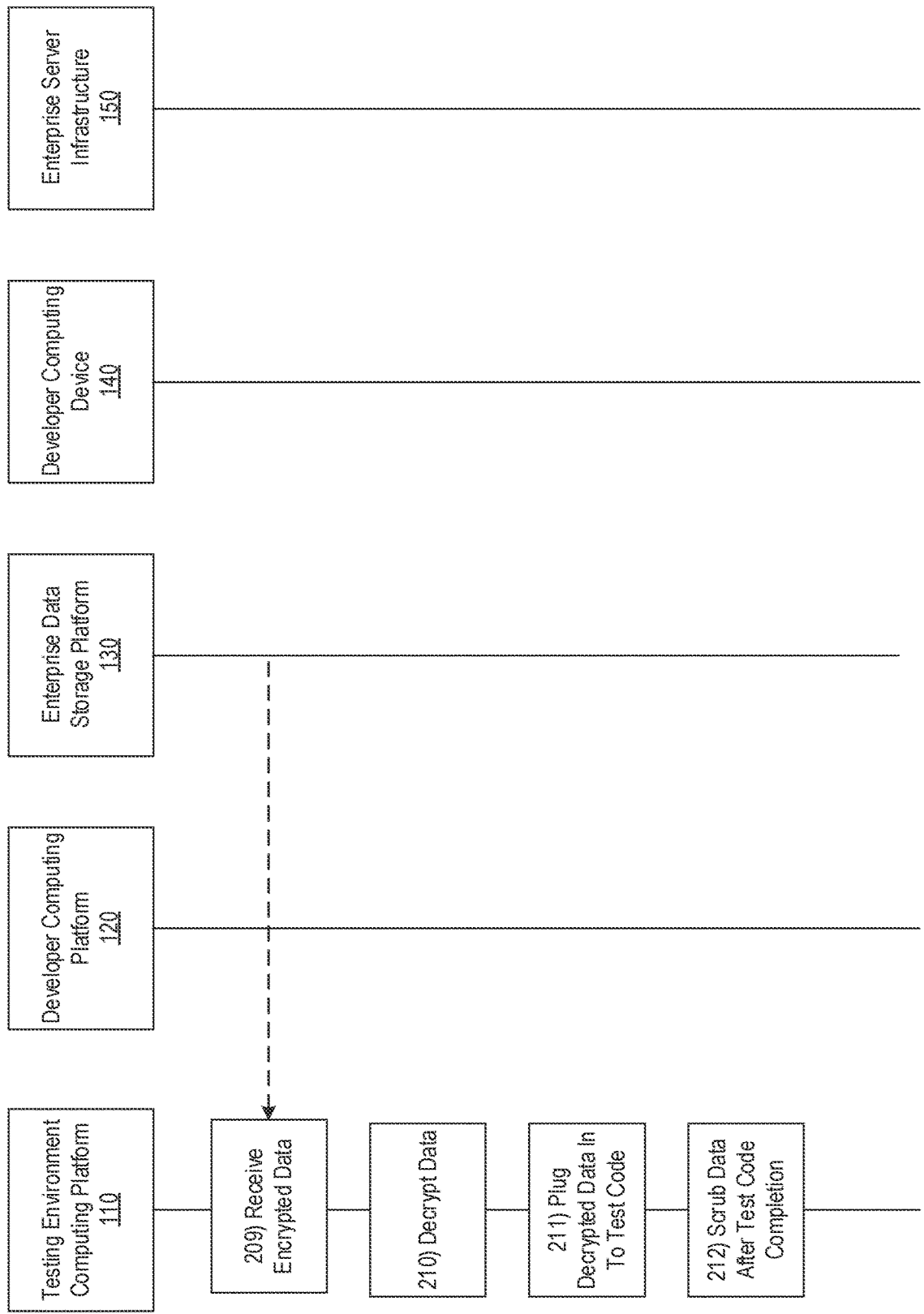

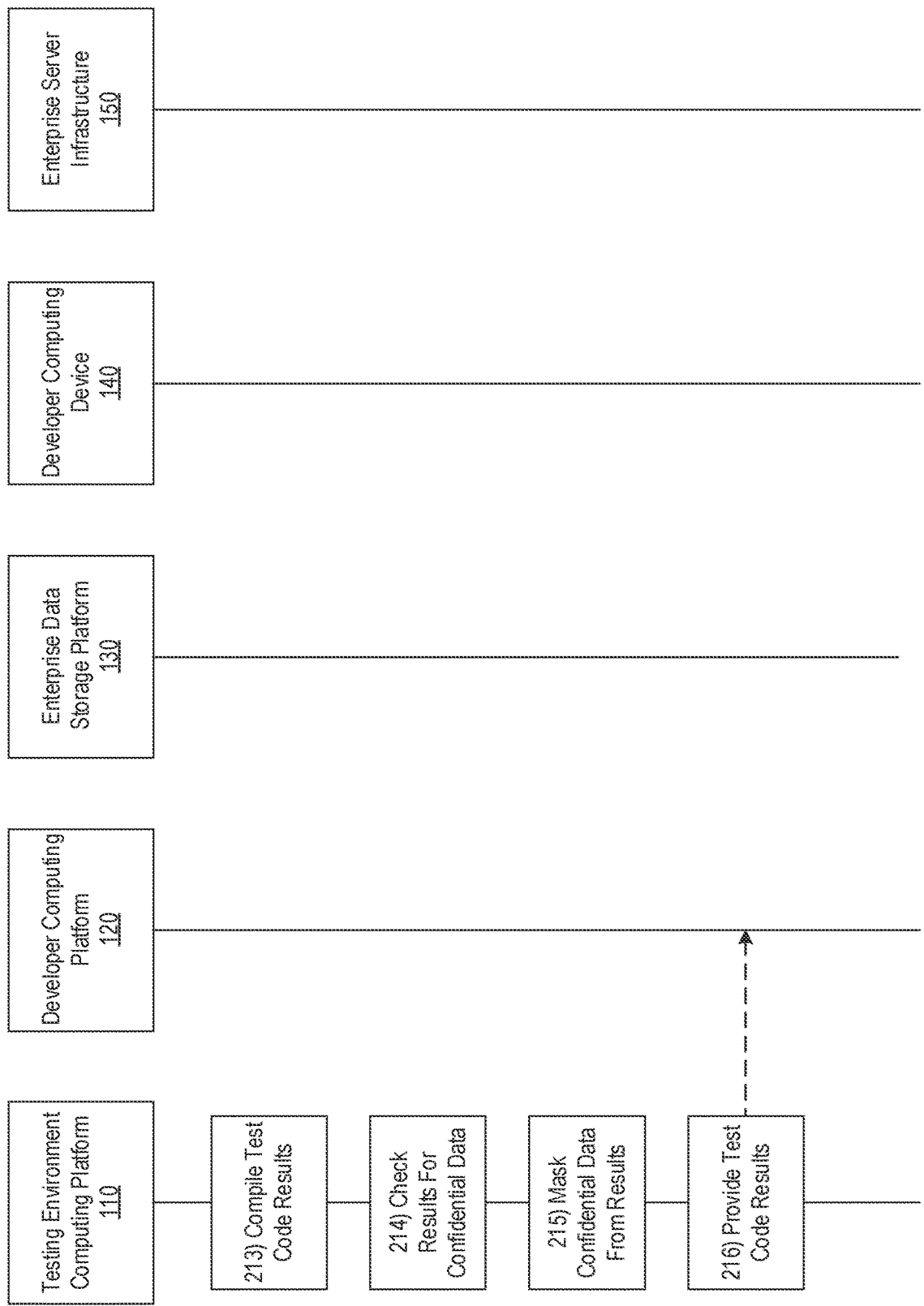

CONDUCTING SOFTWARE TESTING USING DYNAMICALLY MASKED DATA

CROSS-REFERENCE TO RELATED APPLICATIONS

This application claims the benefit of and is a continuation of U.S. patent application Ser. No. 17/068,257, filed Oct. 12, 2020, and entitled "Conducting Software Testing Using Dynamically Masked Data," which is incorporated by reference herein in its entirety.

BACKGROUND

Aspects of the disclosure relate to electrical computers, digital processing systems, and automated task management and control. In particular, one or more aspects of the disclosure relate to conducting software testing using dynamically masked data.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. Ensuring that data integrity is maintained, and timely and targeted preventive measures are undertaken, in real-time with speed and accuracy, may be particularly advantageous to ensure a smooth running of an enterprise infrastructure.

Enterprise organizations frequently have investments in software testing that often span numerous tools running on multiple platforms (e.g., different operating systems) to test various applications and/or systems. Many software tests require the use of a dataset with enterprise information to ensure that the tested software works for its intended purpose. In many instances, such datasets include confidential information. In order to avoid a potential disclosure of confidential information, some systems may scrub or mask all confidential data from a dataset. However, this may render the dataset inadequate for certain testing purposes. In other instances, systems may create artificial test datasets (e.g., not from real data). However, preparation of such test datasets may be time intensive and costly, and may miss errors in the tested software. To improve both security and usability, there is a need for testing software applications on actual datasets while preventing any disclosure of confidential information.

SUMMARY

Aspects of the disclosure provide effective, efficient, scalable, and convenient technical solutions that address and overcome the technical problems associated with software testing by providing dynamically masked data to a testing environment computing platform in a secure manner and that prevent potential disclosure of confidential information to a developer computing system or other related parties.

In accordance with one or more embodiments, a computing platform having at least one processor, a communication interface, and memory may receive, via the communication interface, and from a developer computing platform, a test execution request, the test execution request including a test code for execution. Subsequently, the computing platform may establish a secure connection to an enterprise data storage database. Upon establishing the secure connection, the computing platform may request confidential data from the enterprise data storage database in connection the test execution request. The computing platform may then execute the test code, which may include receiving encrypted confidential data from the enterprise data storage, decrypting the confidential data, and plugging the confidential data into the test code. Upon completing execution of the test code, the computing platform may delete the confidential data from the computing platform. The computing platform may thereafter terminate the secure connection to the enterprise data storage database. The computing platform may then send, via the communication interface, and to the developer computing platform, test code output results.

In some embodiments, sending the test code output results may include performing a confidential data verification check, and upon detecting confidential data in the test code output results, masking the confidential data in the test code output results. Sending the test code output results may include compiling error information. Sending the test code output results may include providing a user interface display on a computing device associated with the developer computing platform. The user interface display may include information related to the test code output results.

In some embodiments, receiving the test execution request may include receiving one or more parameters for executing the test code. The one or more parameters may include as least one of: a programming language, a framework, a programming dependency, a relying subsystem, a cache parameter, or a container environment. In some examples, the memory may store additional computer-readable instructions that, when executed by the at least one processor, cause the computing platform to receive a selected trusted execution environment. Executing the test code may then include executing the test code on the selected trusted execution environment.

In some embodiments, executing the test code may include building and compiling the test code on the computing platform based on information received from the developer computing platform.

In some embodiments, requesting confidential data from the enterprise data storage database may include generating a request for confidential information upon receiving the test execution request. Receiving the encrypted confidential data may include compiling, by the enterprise data storage database, confidential data for transmission and encrypting the confidential data upon being transmitted by the enterprise data storage database.

In accordance with one or more embodiments, a method is provided at a computing platform comprising at least one processor, a communication interface, and memory. The method may include receiving, via the communication interface, from a developer computing platform, a test execution request, the test execution request including a test code for execution, establishing a secure connection to an enterprise data storage database, upon establishing the secure connection, requesting confidential data from the enterprise data storage database in connection the test execution request, executing the test code, where executing the test code includes receiving encrypted confidential data from the enterprise data storage, decrypting the confidential data, and plugging the confidential data into the test code. Upon completing execution of the test code, the method may include deleting the confidential data from the computing platform, and sending, via the communication interface, to the developer computing platform, test code output results.

In some embodiments, sending the test code output results may include performing a confidential data verification check, and upon detecting confidential data in the test code output results, masking the confidential data in the test code output results. Sending the test code output results may include compiling error information. Sending the test code output results may include providing a user interface display on a computing device associated with the developer computing platform. The user interface display may include information related to the test code output results.

In some embodiments, receiving the test execution request may include receiving one or more parameters for executing the test code. The one or more parameters may include as least one of: a programming language, a framework, a programming dependency, a relying subsystem, a cache parameter, or a container environment. In some embodiments, the method may further include receiving a selected trusted execution environment. Executing the test code may then include executing the test code on the selected trusted execution environment.

In some embodiments, executing the test code may include building and compiling the test code on the computing platform based on information received from the developer computing platform. Receiving the encrypted confidential data may include compiling, by the enterprise data storage database, confidential data for transmission and encrypting the confidential data upon being transmitted by the enterprise data storage database.

In accordance with one or more embodiments, one or more non-transitory computer-readable media may be provided storing instructions that, when executed by a computing platform comprising at least one processor, a communication interface, and memory cause the computing platform to receive, via the communication interface, from a developer computing platform, a test execution request, the test execution request including a test code for execution, establish a secure connection to an enterprise data storage database, upon establishing the secure connection, request confidential data from the enterprise data storage database in connection the test execution request, execute the test code, wherein executing the test code includes: receiving encrypted confidential data from the enterprise data storage, decrypting the confidential data, and plugging the confidential data into the test code, upon completing execution of the test code, delete the confidential data from the computing platform, and send, via the communication interface, to the developer computing platform, test code output results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for conducting software testing using dynamically masked data in accordance with one or more example embodiments;

DETAILED DESCRIPTION

Figure 1A:
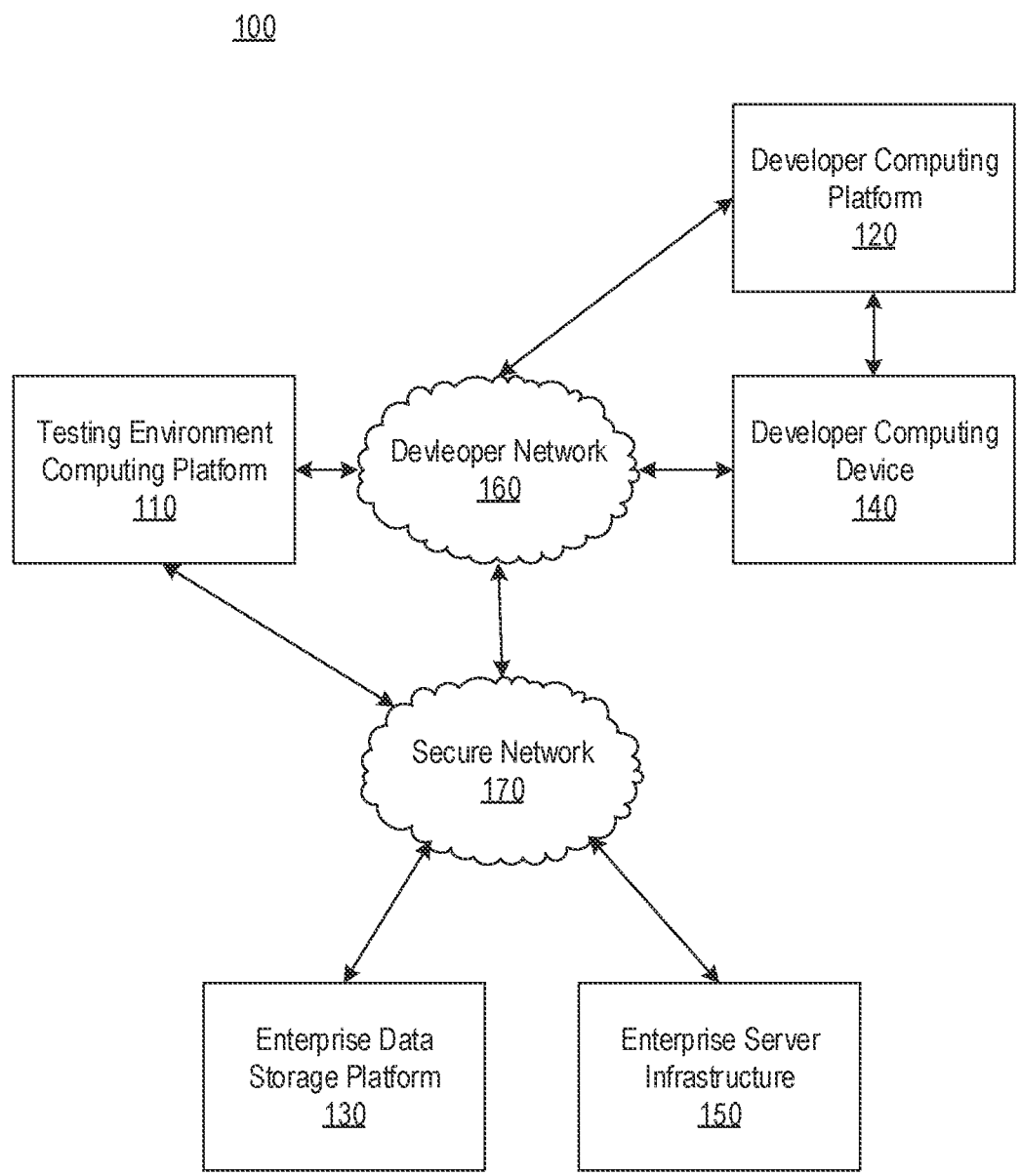
FIGS. 1A and 1B depict an illustrative computing environment for conducting software testing using dynamically masked data in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to conducted software testing using dynamically masked data. In some examples, a testing environment computing platform, separate from a developer computing platform, may establish a secure connection to an enterprise data storage database to receive encrypted confidential data and execute a test code with decrypted confidential data and may report results of executing the test code to the developer computing platform, employing a system architecture that prevents disclosure of confidential data to the developer computing platform.

As mentioned above, protection of confidential information is important concern for corporate and other entities. Often, databases may be used to store data in a computing environment, with the data being stored in such databases so as to be accessed, managed and updated easily. For example, in a database, information may include social security numbers, dates of birth, credit score, account balances, and the like. As another example, in a database, information may include social security numbers, dates of birth, medical histories and diagnoses, and the like. In addition to being in the interest of an organization to keep confidential, in some cases, laws may prohibit access to confidential information by unauthorized users.

Software development and test teams may not necessarily need access to particular data, such as particular social security numbers, but may need a large amount of data. This data may be expensive to provide unless actual production data is used. Similarly, software development and test teams may access data as part of determining if desired repairs were made, if updates were installed, if changes were successfully implemented, or if a database is operating correctly. Prior approaches to restricting access of sensitive data by developers and test teams frequently involved "scrubbing" data, which actually removed the data. Disadvantages with such approaches include difficulty in applying scrubbed data to larger datasets, the time needed to scrub a dataset, and potentially impacting the usefulness of the dataset after being scrubbed.

Accordingly, aspects described herein employ dynamic data masking for software testing, using a testing environment computing platform separate from a developer computing platform and from a data storage platform that stores the dataset, thus, avoiding the need (as well as the associated resources and costs) to create an entirely separate dataset with scrubbed data. In some embodiments, the testing environment computing platform may execute a test code using the dynamically masked dataset and without storing the dataset in a permanent memory storage. Aspects of the present disclosure thus allow for software testing that uses actual (and, in at least some instances, confidential) data, without compromising the confidentiality of such data.

When testing data on an application, software developers are often require to use a dataset to ensure that the software being developed works for its intended purpose. Ideally, actual data (real world data) is employed for such testing, e.g., to better ensure that the application functions as intended. However, in many instances, software teams have no business justification or legitimate right to view such data, particularly where such data includes confidential user information, such as social security numbers associated with individual names. Indeed, in some instances, laws may forbid the viewing of such data where there is no business justification. Known software tools do not have the ability to obstruct such data from view by a developer for the purpose of conduct a software test.

As described herein, dynamic data masking may allow software developers to use actual data without comprising confidentiality of the data. A testing environment computing platform may receive a test code from a developer computing platform and a dataset from a data owner storage platform. In a sense, the software developer may surrender a software code and the data owner may surrender a data set to a separate testing environment computing platform where testing may occur on the dataset, without the developer being able to view the dataset. In that regard, neither the developer nor the data owner may see the data being processed by the software code being executed on the testing environment computing platform. The developer computing device may be presented with software code output results, e.g., success or failure, based on testing the software with actual data. Such results may be presented to the developer computing device without granting the developer access to any of the data itself. In some examples, dynamic data masking may include machine learning to generate a pseudo-real dataset.

The data from the data owner storage platform may be encrypted when being transmitted to the testing environment computing platform. Given the nature of the data that is transmitted to the testing environment computing platform, the data may be stored only transiently in the testing environment computing platform. The testing environment computing platform may be configured to support various coding or programming languages, frameworks, dependencies, relying subsystems, cache parameters, container environments, and the like. Thus, the developer computing device may specify such coding parameters when submitting a test code to the test environment computing platform. The testing environment computing platform may thus dynamically (in real time or near real time) take data from an existing system for testing, and without storing the data. In that regard, the testing environment computing platform may pull data only when needed, e.g., upon hitting database requests in a test code, and may be prevented from dumping memory to desk so as to prevent exfiltration of confidential information. In this manner, the testing environment computing platform may act like an escrow environment between a developer computing platform and a data owner storage platform. Upon completing execution of the test code, the testing environment computing platform may transmit result information back to the developer computing platform that includes the same information that would be provided if the code was running on the developer computing platform, e.g., information about exceptions or error caught during processing the code, misuse of frameworks or classes, other errors encountered during execution of the code, and the like.

Figure 1B:
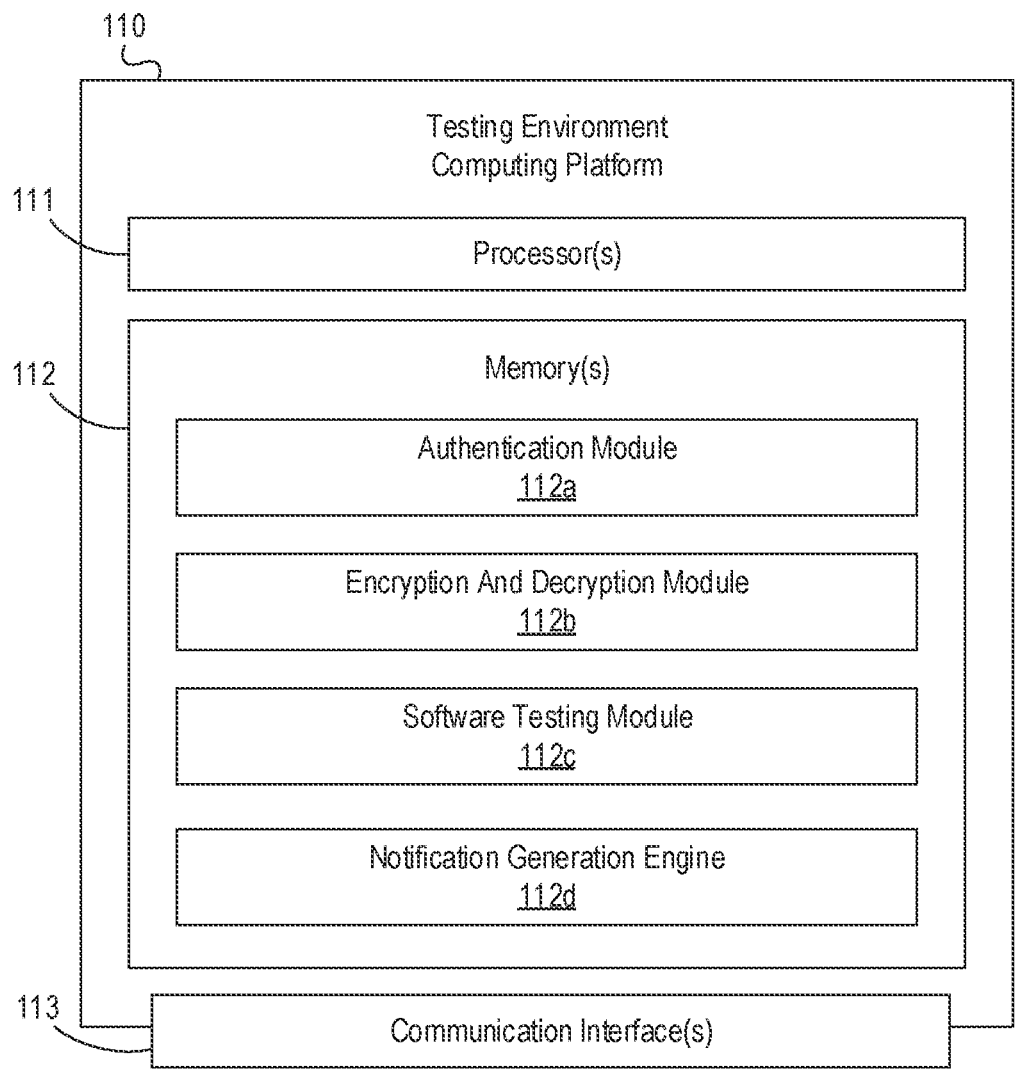

FIGS. 1A and 1B depict an illustrative computing environment for conducting software testing using dynamically masked data in accordance with one or more example embodiments. Referring to FIG. 1A, computing environment 100 may include one or more computer systems. For example, computing environment 100 may include a testing environment computing platform 110, a developer computing platform 120, an enterprise data storage platform 130, a developer computing device 140, and an enterprise server infrastructure 150. Computing environment 100 also may include one or more computing platforms. For example, and as noted above, computing environment 100 may include testing environment computing platform 110.

As illustrated in greater detail below, computing environment 100 also may include one or more networks, which may interconnect one or more of testing environment computing platform 110, developer computing platform 120, enterprise data storage platform 130, developer computing device 140, and enterprise server infrastructure 150. For example, computing environment 100 may include a developer network 160 (which may, e.g., interconnect testing environment computing platform 110, developer computing platform 120, developer computing device 140, and/or one or more other systems which may be associated with an enterprise organization, such as a financial institution, with one or more other systems, public networks, sub-networks, and/or the like). Computing environment 100 may include a secure network 170 (which may connect, e.g., testing environment computing platform 110, enterprise data storage platform 130, and enterprise server infrastructure 150 to developer network 160).

As illustrated in greater detail below, testing environment computing platform 110 may include one or more computing devices configured to perform one or more of the functions described herein. For example, testing environment computing platform 110 may include one or more computers (e.g., laptop computers, desktop computers, servers, server blades, or the like) configured to perform one or more of the functions described herein, as discussed in greater detail below. Testing environment computing platform 110 may be configured to host and/or execute a machine learning engine to provide dynamic data masking and software application functions. In some examples, testing environment computing platform 110 may be connected to one or more developer computing platforms or devices to receive software codes for test executions. In some examples, testing environment computing platform 110 may be connected to one or more data owner storage platforms for receiving dynamically masked data for running test code executions, or the like.

Testing environment computing platform 110 may include distinct and physically separate data centers or other groupings of server computers that are operated by and/or otherwise associated with an organization, such as a financial institution. In addition, testing environment computing platform 110 may house a plurality of server computers and various other computers, network components, and devices. For example, testing environment computing platform 110 may include a plurality of server nodes that are made up of and/or otherwise include one or more servers and/or server blades, which may be monitored and/or controlled by testing environment computing platform 110 and/or one or more other computing devices included in computing environment 100. Each server and/or server blade included in the plurality of server nodes associated with testing environment computing platform 110 may include one or more processors, memories, communication interfaces, storage devices, and/or other components.

The testing environment computing platform 110 may execute test software codes, based on information and/or code parameters received from a developer computing platform or developer computing device. The testing environment computing platform 110 may establish a secure connection to a data storage platform to receive encrypted confidential data to be used in running a test software code execution. For instance, such data may be obtained dynamically, on the fly, and without being saved to permanent storage on the testing environment computing platform 110, as will be described in greater detail below.

Developer computing platform 120 may include one or more computing devices and/or other computer components (e.g., processors, memories, communication interfaces). In addition, and as illustrated in greater detail below, developer computing platform 120 may be configured to receive information from, send information to, and/or otherwise exchange information with one or more devices that are physically present at and/or within a certain range of the enterprise location at which enterprise server infrastructure 150 may be deployed. The enterprise location (e.g., where enterprise server infrastructure 150 is deployed) may be remote from and/or different from a location where the testing environment computing platform 110 and/or the developer computing platform 120 is deployed.

Developer computing device 140 may include one or more computing devices and/or other computer components (e.g., processors, memories, communication interfaces). In addition, and as illustrated in greater detail below, developer computing device 140 may be configured to receive information from, send information to, and/or otherwise exchange information with one or more devices that are physically present at and/or within a certain range of the enterprise location at which enterprise server infrastructure 150 may be deployed. In some examples, however, the developer computing device may be remote from and/or different from the enterprise location (e.g., where enterprise server infrastructure 150 is deployed).

Developer computing device 140 may be a desktop computing device (e.g., desktop computer, terminal), or the like or a mobile computing device (e.g., smartphone, tablet, smart watch, laptop computer, or the like). In addition, developer computing device 140 may be linked to and/or used by one or more enterprise users (who may, e.g., be employees of an enterprise organization operating the enterprise center where developer computing device 140 is deployed and/or used). For instance, developer computing device 140 may be deployed at an enterprise center, such as the enterprise center where enterprise server infrastructure 150 is deployed, so that developer computing device 140 may be used by one or more employees of an enterprise organization operating the enterprise center when such employees are facilitating enterprise software development efforts. For example, developer computing device 140 may store and/or execute one or more enterprise applications, such as user account management applications, user history applications, account security applications, and/or other software applications, which may be used by the one or more enterprise users of developer computing device 140.

In one or more arrangements, developer computing device 140, and other computing devices included in computing environment 100 may be any type of computing device capable of receiving a user interface, receiving input via the user interface, and communicating the received input to one or more other computing devices. For example, developer computing device 140 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Developer computing platform 120 and/or developer computing device 140 may be configured to provide one or more interfaces that allow for configuration and management of one or more other computing devices and/or computer systems included in computing environment 100, such as one or more interfaces that allow for configuration and management of testing environment computing platform 110. Developer computing platform 120 and/or developer computing device 140 may be configured to provide one or more interfaces that allow for interaction with and use of one or more other computing devices and/or computer systems included in computing environment 100, such as one or more interfaces that allow for interaction with and use of testing environment computing platform 110.

Enterprise data storage platform 130 may include one or more computing devices and/or other computer components (e.g., processors, memories, communication interfaces). In addition, and as illustrated in greater detail below, enterprise data storage platform 130 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise data storage platform 130 may be deployed.

Enterprise server infrastructure 150 may include one or more computing devices and/or other computer components (e.g., processors, memories, communication interfaces). In addition, enterprise server infrastructure 150 may be configured to host, execute, and/or otherwise provide one or more enterprise applications. For example, enterprise server infrastructure 150 may be configured to host, execute, and/or otherwise provide an enterprise mobile application for user devices, and/or other programs associated with an enterprise server. In some instances, enterprise server infrastructure 150 may be configured to provide various enterprise and/or back-office computing functions for an enterprise organization, such as a financial institution. For example, enterprise server infrastructure 150 may include various servers and/or databases that store and/or otherwise maintain account information, such as financial account information including account balances, transaction history, account owner information, and/or other information. In addition, enterprise server infrastructure 150 may process and/or otherwise execute tasks on specific accounts based on commands and/or other information received from other computer systems included in computing environment 100. Additionally, or alternatively, enterprise server infrastructure 150 may receive instructions from testing environment computing platform 110 and execute the instructions in a timely manner, e.g., for the secure transfer of encrypted data.

Enterprise server infrastructure 150 may include multiple server computers that are owned, operated, maintained, and/or otherwise used by an organization, such as an enterprise organization associated with testing environment computing platform 110. For example, enterprise server infrastructure 150 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, enterprise server infrastructure 150 may include one or more computer systems that are configured to provide one or more portal interfaces to one or more client devices and/or configured to authenticate one or more client devices and/or users of such devices to such portal interfaces. For example, enterprise server infrastructure 150 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in enterprise server infrastructure 150) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, enterprise server infrastructure 150 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

In some arrangements, testing environment computing platform 110, developer computing platform 120, enterprise data storage platform 130, developer computing device 140, and enterprise server infrastructure 150 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because testing environment computing platform 110 is able to access confidential information, e.g., for the purpose of executing a test software application and without disclosing confidential information. Machine learning (e.g., by testing environment computing platform 110) may be used to efficiently receive encrypted enterprise data and decrypt that data for use in executing a test software application.

Developer computing platform 120, enterprise data storage platform 130, developer computing device 140, and enterprise server infrastructure 150 may be configured to communicate with and/or connect to one or more computing devices or systems shown in FIG. 1A. For instance, developer computing platform 120 and/or developer computing device 140 may communicate with one or more computing systems or devices via developer network 160, while enterprise data storage platform 130 and/or enterprise server infrastructure 150 may communicate with one or more computing systems or devices via secure network 170. In some examples, developer computing platform 120 and/or developer computing device 140 may be used to control or implement aspects of the functions performed by testing environment computing platform 110, with respect to execution of one or more test execution codes, and the like.

In one or more arrangements, developer computing platform 120, enterprise data storage platform 130, developer computing device 140, and/or enterprise server infrastructure 150 may be any type of computing device or combination of devices capable of performing the particular functions described herein. For example, developer computing platform 120, enterprise data storage platform 130, developer computing device 140, and/or enterprise server infrastructure 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of developer computing platform 120, enterprise data storage platform 130, developer computing device 140, and/or enterprise server infrastructure 150 may, in some instances, be special-purpose computing devices configured to perform specific functions.

As mentioned above, computing environment 100 also may include one or more networks, which may interconnect one or more of testing environment computing platform 110, developer computing platform 120, enterprise data storage platform 130, developer computing device 140, and/or enterprise server infrastructure 150. For example, computing environment 100 may include developer network 160 and secure network 170. Developer network 160 and/or secure network 170 may include one or more sub-networks (e.g., Local Area Networks (LANs), Wide Area Networks (WANs), or the like). Secure network 170 may be associated with a particular organization (e.g., a corporation, financial institution, educational institution, governmental institution, or the like) and may interconnect one or more computing devices associated with the organization.

For example, testing environment computing platform 110, developer computing platform 120, enterprise data storage platform 130, developer computing device 140, and/or enterprise server infrastructure 150, may be associated with an organization (e.g., a financial institution), and developer network 160 and/or secure network 170 may be associated with and/or operated by the organization, and may include one or more networks (e.g., LANs, WANs, virtual private networks (VPNs), or the like) that interconnect testing environment computing platform 110, developer computing platform 120, enterprise data storage platform 130, developer computing device 140, enterprise server infrastructure 150, and one or more other computing devices and/or computer systems that are used by, operated by, and/or otherwise associated with the organization.

Developer network 160 may connect secure network 170 and/or one or more computing devices connected thereto (e.g., testing environment computing platform 110, developer computing platform 120, enterprise data storage platform 130, developer computing device 140, enterprise server infrastructure 150) with one or more networks and/or computing devices that are not associated with the organization. For example, enterprise data storage platform 130 might not be associated with an organization that operates secure network 170 (e.g., enterprise data storage platform 130 may be owned, operated, and/or serviced by one or more entities different from the organization that operates secure network 170, such as one or more customers of the organization, public or government entities, and/or vendors of the organization, rather than being owned and/or operated by the organization itself or an employee or affiliate of the organization), and developer network 160 may include one or more networks (e.g., the internet) that connects enterprise data storage platform 130 to secure network 170 and/or one or more computing devices connected thereto.

In one or more arrangements, testing environment computing platform 110, developer computing platform 120, enterprise data storage platform 130, developer computing device 140, and/or enterprise server infrastructure 150 may be any type of computing device capable of receiving a user interface, receiving input via the user interface, and communicating the received input to one or more other computing devices. For example, testing environment computing platform 110, developer computing platform 120, enterprise data storage platform 130, developer computing device 140, enterprise server infrastructure 150, and/or the other systems included in computing environment 100 may, in some instances, include one or more processors, memories, communication interfaces, storage devices, and/or other components. As noted above, and as illustrated in greater detail below, any and/or all of testing environment computing platform 110, developer computing platform 120, enterprise data storage platform 130, developer computing device 140, and/or enterprise server infrastructure 150 may, in some instances, be special-purpose computing devices configured to perform specific functions.

Referring to FIG. 1B, testing environment computing platform 110 may include one or more processors 111, one or more memories 112, and one or more communication interfaces 113. A data bus may interconnect the one or more processors 111, the one or more memories 112, and the one or more communication interfaces 113. Communication interface 113 may be a network interface configured to support communication between testing environment computing platform 110 and one or more networks (e.g., developer network 160, secure network 170, or the like). Memory 112 may include one or more program modules having instructions that when executed by processor 111 cause testing environment computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of testing environment computing platform 110 and/or by different computing devices that may form and/or otherwise make up testing environment computing platform 110. For example, memory 112 may have, store, and/or include an authentication module 112a, an encryption and decryption module 112b, a software testing module 112c, and a notification generation engine 112d.

Authentication module 112a may provide and/or perform one or more functions that may enable receiving authentication information from a user, e.g., submitting a code for testing on the testing environment computing platform 110. For example, authentication information may include a user name, user identification number, user birthday, user password, and/or other authentication information. Authentication module 112a may perform authentication of a user on a computing device associated with the developer computing platform 120 (e.g., developer computing device 140), and/or authentication module 112a may transmit one or more pieces of authentication information to another device (e.g., enterprise data storage platform 130, enterprise server infrastructure 150) for authentication of the user. In some embodiments, authenticating may include causing display of a word or phrase. Authentication module 112a may record a user speaking the word or phrase. Authentication module 112a may perform and/or transmit to another device to perform voice recognition of the user speaking the word or phrase. Authentication module 112a may generate, request, send, and/or receive confirmation of authentication of a user. Based on a user being authenticated, authentication module 112a may allow additional functionality of the testing environment computing device 110. Additional features and functions that may be performed by authentication module 112a are described in greater detail below.

Encryption and decryption module 112b may provide and/or perform one or more functions that may enable encrypting ad decrypting on one or more storage, hard drives, memories, partitions, and the like of a device (e.g., testing environment computing device 110). Encryption and decryption module 112b may run constantly while a device is turned on, encrypting and/or decrypting in real-time (or nearly real-time) files that are accessed, saved, stored, created, copied, moved, and the like. Alternatively, encryption and decryption module 112b may run periodically, encrypting and/or decrypting files that are accessed, saved, stored, created, copied, moved, and the like. Encrypted and decryption module 112b may use one or more encryption algorithms, such as Advanced Encryption Standard (AES) (e.g., in cipher block chaining (CBC) or ciphertext stealing (XTS) mode, with a 128-bit or 256-bit key, and the Elephant diffuser), Data Encryption Standard (DES), BITLOCKER, or the like. Additional features and functions that may be performed by encryption and decryption module 112b are described in greater detail below.

Software testing module 112c may include hardware components and/or executable instructions that enable and/or cause testing environment computing platform 110 to provide a software testing service, such as the test software application discussed below. Software testing module 112c may store test specification details and/or other information associated with conducting software application code testing. Notification generation engine 112d may include hardware components and/or executable instructions that enable and/or cause testing environment computing platform 110 to provide a test code results, such as the test code results discussed below. Notification generation engine 112d may store test results data and/or other information that may result from and/or be determined based on conducting software application testing.

Notification generation engine 112e may have instructions that direct and/or cause testing environment computing platform 110 to send, to another computing device, results related to execution of a test software code. Notification generation engine 112e may store instructions and/or data that may cause or enable the testing environment computing platform 110 to dynamically generate and/or execute notifications. For instance, in some examples, error information may be compiled following the execution of a test software code on the testing environment computing platform 110. Accordingly, as test code result and error information is compiled, one or more notifications may be dynamically generated and transmitted to provide relevant information to a developer computing device associated with the test code (e.g., developer computing platform 120, developer computing device 140). For instance, the notification generation engine 112e may generate a notification for transmission to a developer device that simulates the output that might be presented if the test code was run locally on a developer computing device.

Figure 2A:
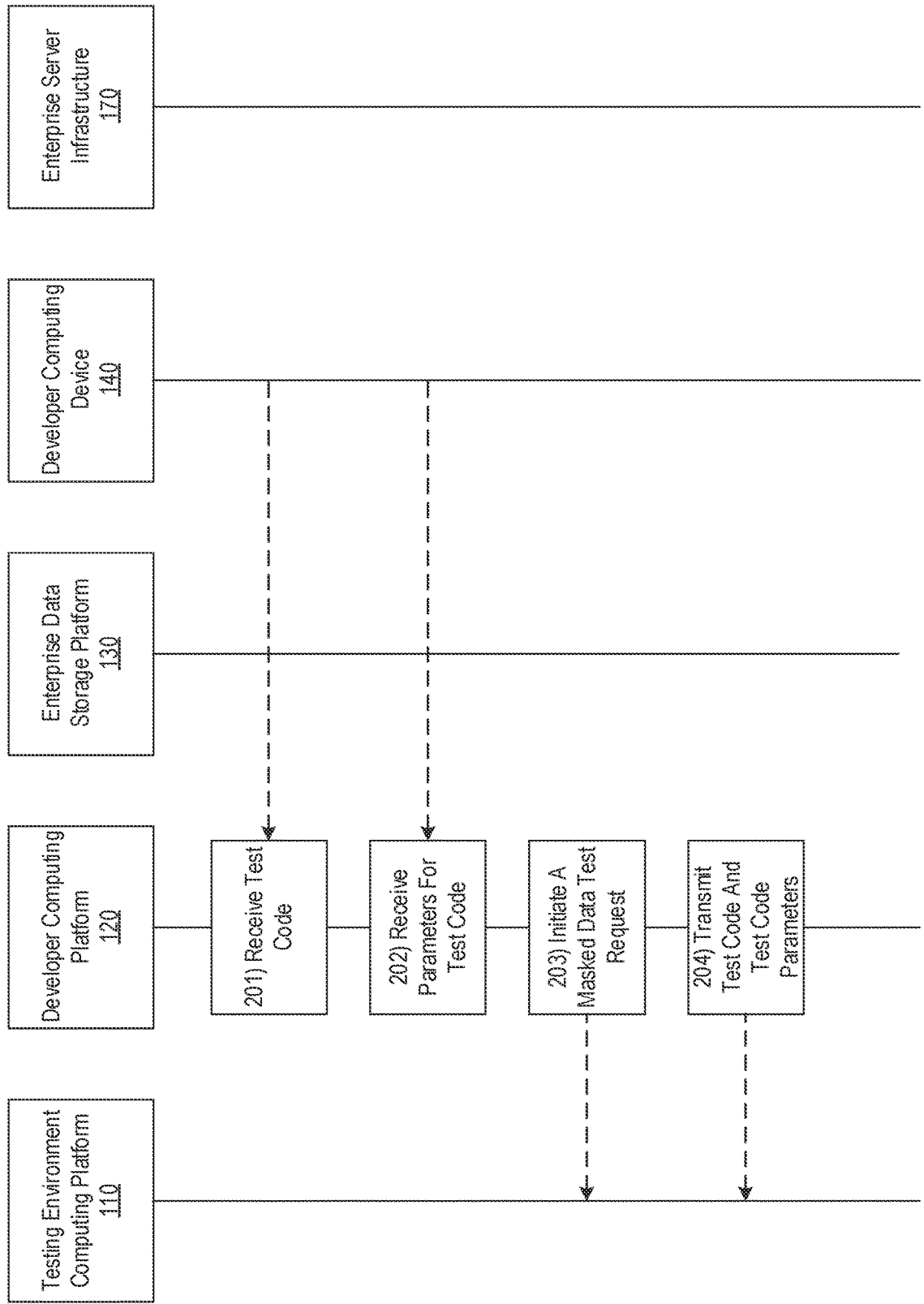

FIGS. 2A-2E depict an illustrative event sequence for conducting software testing using dynamically masked data in accordance with one or more example embodiments. Referring to FIG. 2A, at step 201, the developer computing platform 120 may initially receive a test code from a developer computing device 140 (and/or from one or more other sources). For example, at step 201, developer computing platform 120 may receive at least a portion of test specification details information that may, for instance, include: information specifying one or more specific, different tests to run for one or more specific, different types of applications; information specifying one or more specific hosts and/or specific types of hosts those tests should be run on; information specifying how to launch those tests (e.g., information specifying command line functions, arguments, parameters, and/or other launch information); and/or the like. The tests that may be defined in the test code request received by developer computing platform 120 from developer computing device 140 may include any type of software application tests, such as security-related tests, server-side tests and/or service-based architecture tests, fat-client and/or heavy-user-interface tests, user-application tests, web-based application tests, and/or other types of tests.

At step 202, the developer computing platform 120 may receive one or more parameters for running the test code from a developer computing device 140 (and/or from one or more other sources). In some instances, one or more parameters for running the test code received at step 202 may include coding or programming languages, frameworks, dependencies, relying subsystems, cache parameters, container environments, and the like.

At step 203, the developer computing platform 120 may initiate a masked data test execution request (e.g., identifying a particular application to be tested and a particular environment for conducting such testing) and may transmit the request to the testing environment computing platform 110. For example, at step 203, testing environment computing platform 110 may receive, via a communication interface (e.g., communication interface 113), from a developer computing platform (e.g., developer computing platform 120), a masked data test execution request. In some embodiments, receiving the masked data test execution request from the developer computing platform 120 may include receiving information identifying a specific software application to be tested in a specific computing environment. For example, in receiving the masked data test execution request from the developer computing platform 120, testing environment computing platform 110 may receive information identifying a specific software application to be tested in a specific computing environment. In some instances, initiating the masked data execution request at step 203 may include authenticating the request using authentication module 112a, e.g., to verify that the developer device associated with the masked data execution request is a verified device or that a user at the developer device is a verified user.

Figure 4:
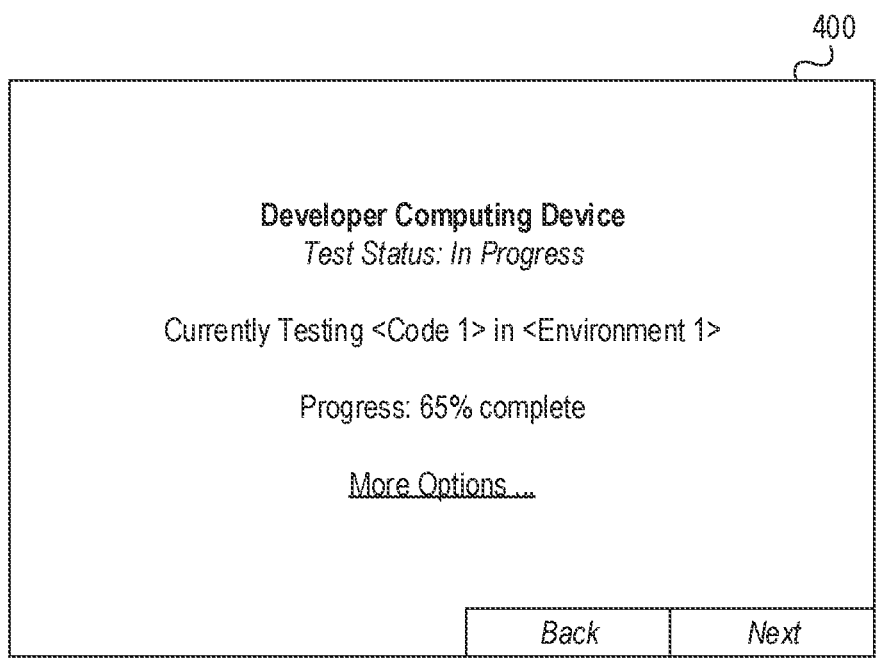

In some instances, in receiving the masked data test execution request from developer computing platform 120, testing environment computing platform 110 may receive a message and/or other information from developer computing platform 120 and/or developer computing device 140 corresponding to one or more selections made via one or more graphical user interfaces presented by developer computing platform 120, such as graphical user interface 400, which is depicted in FIG. 4. As seen in FIG. 4, graphical user interface 400 may include one or more user interface elements enabling a user of developer computing device 140 to specify a particular application to be tested and a particular environment for testing the application, specify other options associated with the testing, and/or initiate the test execution request.

Based on the masked data test execution request, at step 204, the developer computing platform 120 may transmit the test code and the one or more parameters for running the test code to the testing environment computing platform 110. For example, at step 204, the test code and the one or more parameters for running the test code transmitted to the testing environment computing platform 110 may be based on, or the same as, the test code and the one or more parameters for running the test code received at respective steps 201 and 202.

Figure 2B:
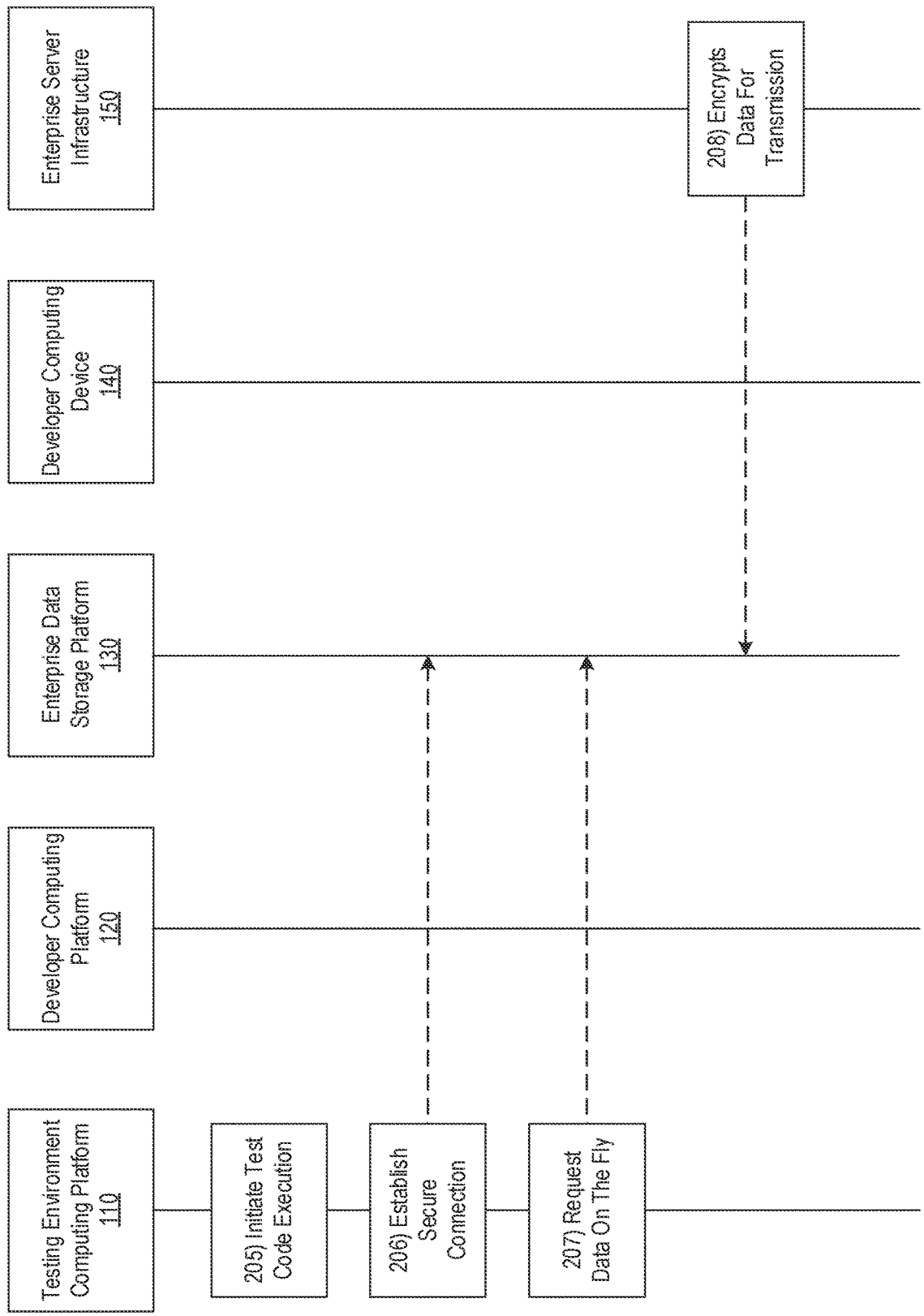

Referring to FIG. 2B, at step 205, testing environment computing platform 110 may initiate a test code execution based on the test code and the one or more parameters for running the test code received at step 204. For example, at step 205, testing environment computing platform 110 may identify one or more tests to execute based on the test code received from the developer computing platform 120 at step 204. Testing environment computing platform 110 may, for instance, identify the one or more tests to execute by matching information from the test code execution request (which may, e.g., specify a particular application to be tested in a particular environment) with corresponding test specification details information (which may, e.g., specify what tests should be run to facilitate testing of the particular application, where such tests should be run, how such tests should be launched, and/or the like) so as to initiate and/or complete testing of the specified application in the specified environment.

At step 206, testing environment computing platform 110 may establish a secure connection to the enterprise data storage platform 130. For example, at step 206, establishing the secure connection may be a first step or an early step in initiating execution of the test code and obtaining data from the enterprise data storage platform 130 on the fly, while running the code.

At step 207, testing environment computing platform 110 may request data on the fly from the enterprise data storage platform while running the code. For example, at step 207, testing environment computing platform 110 may send, via the communication interface (e.g., communication interface 113), to the enterprise data storage platform 130, one or more data request execution commands directing the enterprise data storage platform 130 to transmit the one or more datasets identified based on the relevant portions of the test execution code and/or test specification details information received from the developer computing platform 120 and/or the developer computing device 140.

At step 208, enterprise server infrastructure 150 may encrypt one or more datasets stored on the enterprise data storage platform 130 for transmission to the testing environment computing platform 110. For example, at step 208, after receiving the data request at step 207, one or more relevant datasets may be identified and an encryption process may be executed by the enterprise server infrastructure and/or the enterprise data storage platform. For instances, at step 208, the identified one or more datasets may be converted and/or transformed into scrambled and/or unreadable test using non-readable mathematical calculations and algorithms. Encrypting the one or more datasets at step 208 may include transforming information using an algorithm or cipher to make the data unreadable to anyone except those possessing an encryption key. Encrypting the data at step 208 may help to protect such data in transferring it to other computing platforms or networks.

Referring to FIG. 2C, at step 209, testing environment computing platform 110 may receive encrypted data sent from the enterprise data storage platform 130. For example, at step 209, testing environment computing platform 110 may receive one or more data sets that were encrypted by the enterprise server infrastructure 150 at step 208. Testing environment computing platform 110 may, for instance, receive a type on encrypted data that is specific to a data type in the data request transmitted at step 207. The encrypted data also may, for instance, be encrypted in accordance with a preferred encryption algorithm of the enterprise server infrastructure 150 or the encryption and decryption module 112b the testing environment computing platform 110.

At step 210, testing environment computing platform 110 may decrypt the data received at step 209 from the enterprise data storage platform 130. For example, at step 210, testing environment computing platform 110 may decrypt, via the encryption and decryption module 112b, the received data so as to be usable in executing the test code. In some instances, in decrypting the data, testing environment computing platform 110 may transmit a request for an encryption recovery key. An encryption recovery key may be a string that, when provided to a computing device storing encrypted data, allows access to the encrypted data. For example, a computing device with a whole-disk encrypted storage may, when provided with a drive-encryption recovery key, allow for relevant data on the computing device to be accessed. In some embodiments, if the testing environment computing platform 110 is connected to a domain, the testing environment computing platform 110 may contact an administrator of the domain (e.g., through the enterprise server infrastructure 150) to retrieve the recovery key. In some embodiments, if the testing environment computing platform 110 is not connected to a domain, the recovery key may have been saved in an account, to a file, a flash drive, printed to hard copy, or the like.

At step 210, the testing environment computing platform 110 may determine the recovery key. For example, the testing environment computing platform 110 may retrieve a stored recovery key from a database. The drive-encryption recovery key may have been generated at the time that the data was encrypted. In some embodiments, the drive-encryption recovery key may be stored in a database in one or more of the domains of the organization. Alternatively or additionally, in some embodiments, the drive-encryption recovery key may be generated in response to the request for the drive-encryption recovery key. The recovery key may uniquely correspond to the device for which the recovery is requested. Alternatively, the recovery key may provide access to more than one device. For example, the recovery key may provide access to each device associated with the testing environment computing platform 110.

At step 211, testing environment computing platform 110 may plug the decrypted data into the test code and continue execution of the test code. For example, at step 211, in response to decrypting the data received from the enterprise data storage platform 130, the computing platform 110 may progress through execution of the test code including portions where the decrypted data is read in and used. In some instances, while continuing to execute the test code, testing environment computing platform 110 may generate one or more user interfaces having status information indicative of the progress of the testing. In addition, testing environment computing platform 110 may send such user interfaces to the developer computing platform 120 and/or the developer computing device 140 and/or otherwise cause the developer computing platform 120 and/or the developer computing device 140 to display such user interfaces. For example, while executing the test code, testing environment computing platform 110 may generate and send to the developer computing platform 120 and/or the developer computing device 140 a graphical user interface similar to graphical user interface 400, which is depicted in FIG. 4. As seen in FIG. 4, graphical user interface 400 may include status information identifying the application currently being tested and the environment in which the application is being tested, progress information identifying how far along the testing is, and/or other user interface elements enabling a user of the developer computing platform 120 and/or the developer computing device 140 to specify other options associated with the testing. An interface similar to graphical user interface 400 may be presented at any time during execution of the test code, and/or up until completion of the test code.

At step 212, upon completion of the test code execution, the testing environment computing platform 110 may scrub the decrypted data used in the execution of the test code. Scrubbing or deleting such data after the completion of the test code may help ensure that the data is only transiently stored on the testing environment computing platform 110 while a test code is executing. Scrubbing the data at step 212 may further safeguard the confidential decrypted data from any inadvertent disclosure. In some examples, the testing environment computing platform 110 may proceed to scrubbing the data at step 212 immediately or soon after completing execution of the test code.

Referring to FIG. 2D, at step 213, testing environment computing platform 110 may compile test code results that results from running the test code. Such results may include a simple pass or fail indicator, and/or error information relating to any errors encountered. In remotely compiling test code results, testing environment computing platform 110 may capture raw test output and/or may process the raw test output. For instance, testing environment computing platform 110 may harvest and/or otherwise capture what is occurring on the test environment computing platform 110 as the test code is being executed and may interrogate data received to determine whether specific tests within the test code are passing or failing. In addition, testing environment computing platform 110 may write results data to a results database (e.g., on the software testing module 112c).

In some embodiments, the compiled test code results may include results from one or more command line instructions that may cause the test environment computing platform 110 to run one or more tests that write pass-fail output associated with the one or more tests to a console. For example, the one or more command line instructions to be executed by the test environment computing platform 110 may cause the test environment computing platform 110 to run one or more tests that write pass-fail output associated with the one or more tests to a console. For instance, the one or more command line instructions to be executed by the testing environment computing platform 110 may cause the test environment computing platform 110 to run one or more tests that write pass-fail outputs, as discussed in the examples above.

In some embodiments, compiling test code results at step 213 may include capturing the pass-fail output associated with the one or more tests from the console. For example, in capturing the test output, testing environment computing platform 110 may capture the pass-fail output associated with the one or more tests from the console. For instance, the testing environment computing platform 110 may capture the pass-fail output associated with the one or more tests using one or more regular expressions and/or other output capture tools, as discussed in the examples above.

In some embodiments, compiling test code results at step 213 may include processing the test output captured to produce test results data. For example, in remotely capturing the test output, the testing environment computing platform 110 may process the test output captured to produce test results data. The test results data may, for instance, include information identifying specific tests that passed, specific tests that failed, specific hosts that executed specific tests, and/or other information associated with the testing.

In some embodiments, compiling test code results at step 213 may include determining that a first set of tests passed based on the test output captured and based on determining that a second set of tests failed based on the test output captured. For example, in processing the test output captured to produce the test results data, testing environment computing platform 110 may determine that a first set of tests passed based on the test output captured and may determine that a second set of tests failed based on the test output captured.

In some embodiments, compiling test code results at step 213 may include may include compiling timestamps indicating when one or more specific tests started and ended, information identifying a name of a specific host on which the one or more specific tests were run, information identifying a number of assertions that passed, and information identifying a number of assertions that failed. For example, in compiling test code results at step 213, the testing environment computing platform 110 may store timestamps indicating when one or more specific tests started and ended on the software testing module 112c of the testing environment computing platform 110, information identifying a name of a specific host associated with software testing module 112c on which the one or more specific tests were run, information identifying a number of assertions that passed during the testing executed on the software testing module 112c, information identifying a number of assertions that failed during the testing executed on software test module 112c, and/or other information associated with the testing executed on the software testing module 112c.

At step 214, testing environment computing platform 110 may perform a verification check on the compiled test results data to check for the presence of any confidential data. While confidential data may not be expected to be present in the compiled test code results, the verification check at step 213 may serve as an additional safeguard against the potential inadvertent disclosure of confidential data. In some examples, step 214 may occur upon testing environment computing platform 110 determining that certain types of information are included in the compiled test results that may present a possibility of certain types of confidential data. In that regard, the inclusion of certain data in the compiled test code results at step 213 may trigger the verification check performed at step 214. In some examples, testing environment computing platform 110 may identify the presence of confidential data in the compiled test code results based on known formats of such confidential data, e.g., social security numbers, addresses, dates of birth, and the like. In some examples, testing environment computing platform 110 may identify the presence of confidential data in the compiled test code results based on a type of test result involved and whether such output would include confidential data.

In examples where the testing environment computing platform 110 identified confidential data in the compiled test code, at step 215, the testing environment computing platform 110 may mask the confidential data from the compiled test results. Masking the confidential data may include irreversibly transforming the data or replacing data components with fictional data components. In some examples, masking the data may include simply removing or blocking one or more data components. In some examples, masking the data may include obfuscating one or more data components and replacing such components with benign replicas. Unlike the above-described encryption processes, masking the data at step 215 may be an irreversible process for which no encryption key is available to transform the data back to the original (and, in this case, confidential) data.

By masking confidential data at step 215, the compiled test code results may be modified to a format that is presentable to a developer computing device (e.g., developer computing platform 120 and/or developer computing device 140) without granting the developer access to any of the data itself. In some examples, masking the data at step 214 may include dynamic data masking, e.g., that may use machine learning to generate a pseudo-real dataset. For instance, at step 215, the testing environment computing platform 110 may apply a machine learning model for the detection and masking of confidential data. For example, the testing environment computing platform 110 may train a machine learning classification model to the test result data outputted by the testing environment computing platform 110. For instance, testing environment computing platform 110 may train the machine learning model to generate a pseudo-real dataset based on detecting confidential data in the dataset. In training the machine learning model to test results data, testing environment computing platform 110 may compute a masked dataset that masks confidential data in test code results.

At step 216, testing environment computing platform 110 may provide the compiled (and, in at least some instances, masked) test code results to the developer computing platform 120. In some instances, the testing environment computing platform 110 may provide the test code results to one or more other computing devices or systems, such as a computing device of the enterprise server infrastructure 150, developer computing device 140, and the like. In some examples, the developer computing platform or device that sent the test code and test execution request may be the same computing platform or device to which the testing environment computing platform 110 provides test code results at step 216.

Figure 2E:
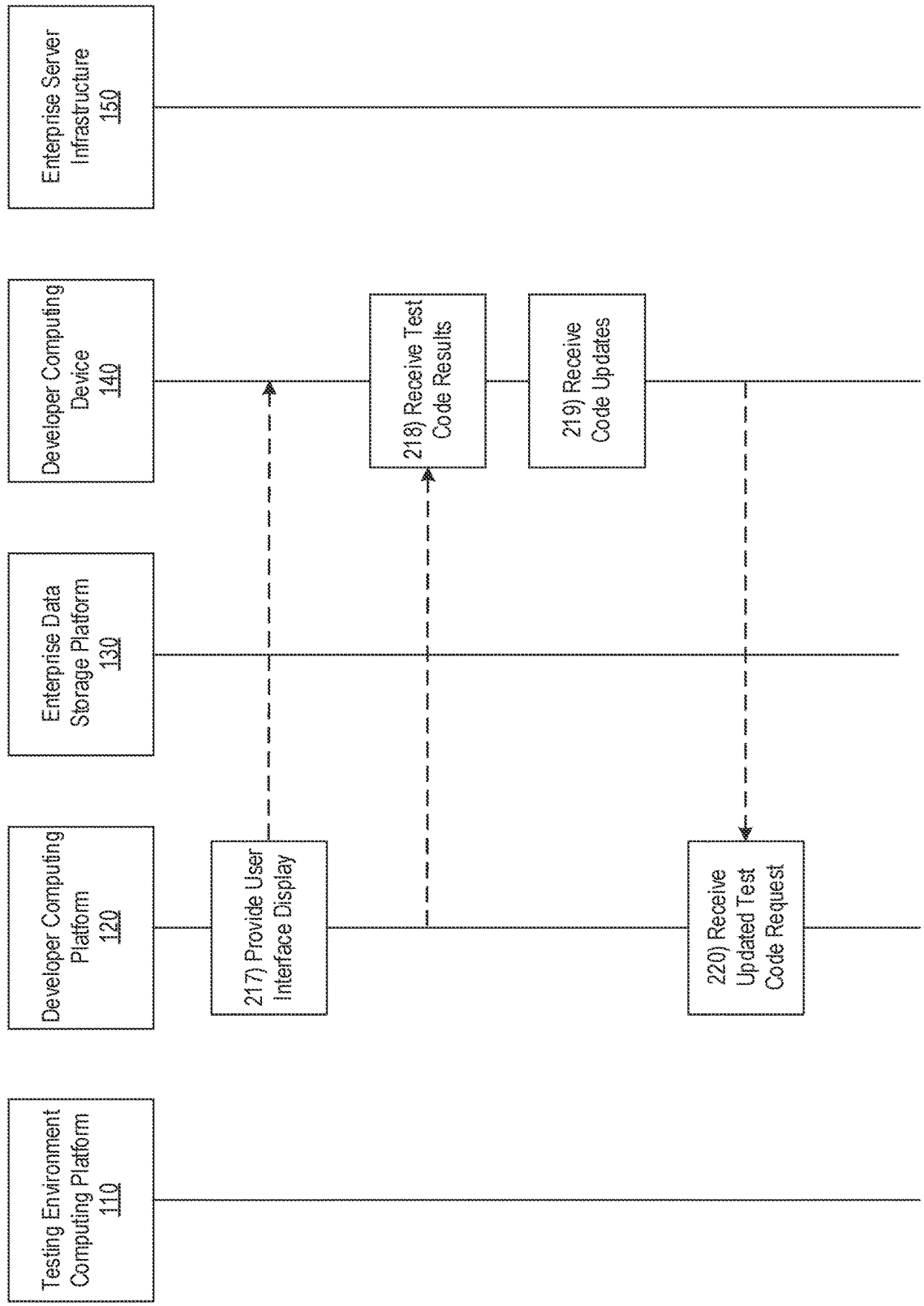

Referring to FIG. 2E, at step 217, the developer computing platform 120 may provide a user interface display to the developer computing device 140. In some instances, the user interface display may include the compiled (and, in at least some instances, masked) test code results that was provided to the developer computing platform 120 at step 216. In some instances, the developer computing platform 120 may provide the user interface display to one or more other computing devices or systems, such as a computing device of the enterprise server infrastructure 150. In some examples, the developer computing device that initially sent the test code and test execution request may be the same computing device to which the testing environment computing platform 110 provides the user interface display at step 217.

Figure 5:
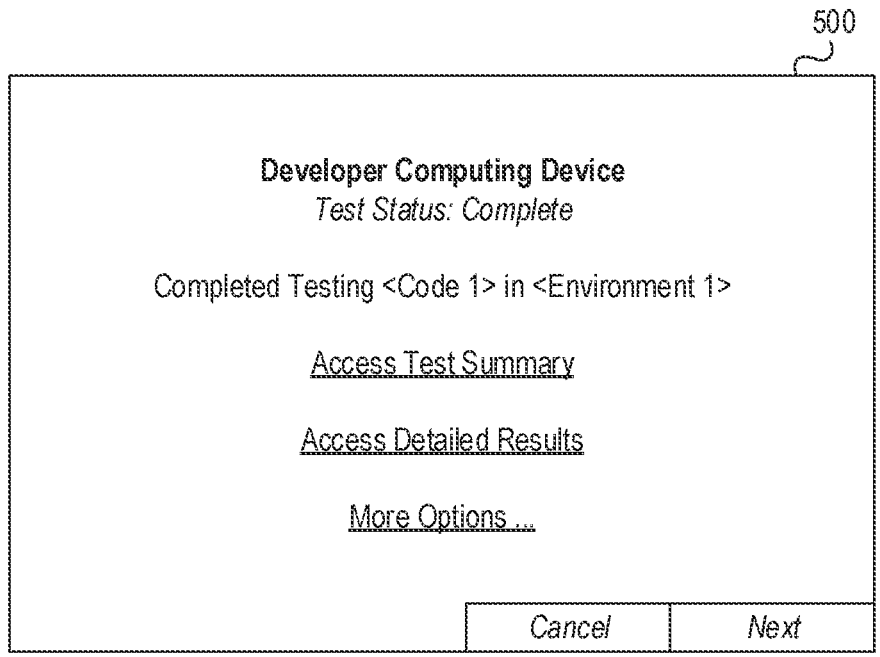
Figure 6:
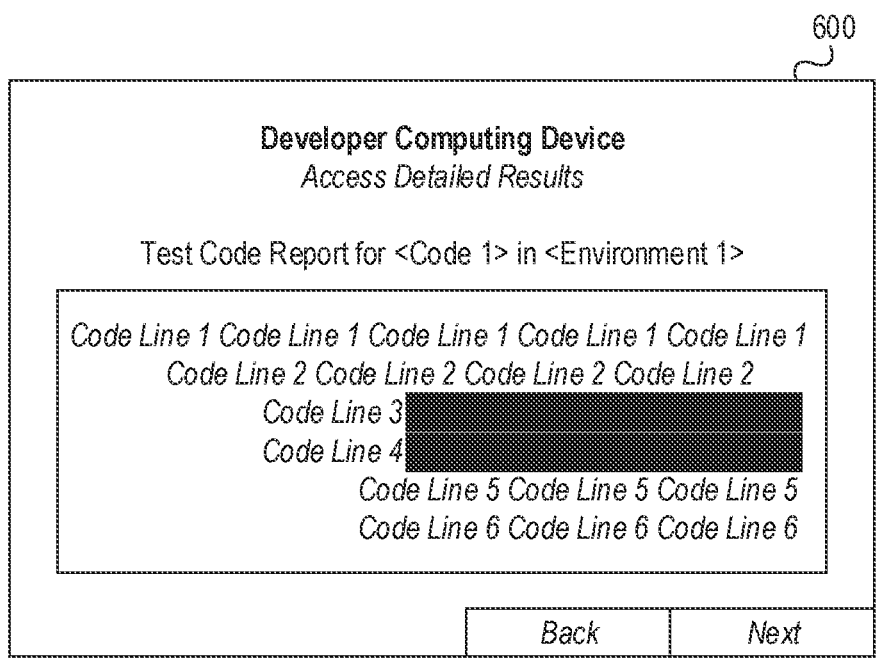

At step 218, the developer computing device 140 may receive the test code results from the developer computing platform 120 for display on the user interface display. In some instances, the developer computing platform 120 may provide a message and/or other information to the developer computing device 140 corresponding to one or more results from executing the test code, and may include one or more graphical user interfaces presented or displayed on the developer computing device 140, such as graphical user interface 500, which is depicted in FIG. 5, and/or graphical user interface 600, which is depicted in FIG. 6. As seen in FIG. 5, graphical user interface 500 may include one or more user interface elements enabling a user of the developer computing device 140 to access a test summary report associated with the execution of the test code by the testing environment computing platform 110, access detailed test results associated with the execution of the test code by testing environment computing platform 110, and/or access other options associated with execution of the test code by testing environment computing platform 110. As seen in FIG. 6, graphical user interface 600 may include one or more user interface elements enabling a user of the developer computing device 140 to view raw test results data associated with the execution of the test code by the testing environment computing platform 110, and may further include masking or blocking of certain raw test results data where the testing environment computing platform 110 has detected such data as containing confidential information.

Figure 3:
FIGS. 3-6 depict example graphical user interfaces for conducting software testing using dynamically masked data in accordance with one or more example embodiments.

While graphical user interface 300 of FIG. 3, graphical user interface 400 of FIG. 4, graphical user interface 500 of FIG. 5, and graphical user interface 600 of FIG. 6 are depicted for display on the developer computing device 140, similar graphical user interfaces may also be generated, displayed, and/or otherwise presented on other computing devices or systems, such as a computing device of the enterprise server infrastructure 150, testing environment computing platform 110, and the like.

In some instances, receiving the test code results information from the developer computing platform 120 may include receiving a request for the test code results via a web dashboard provided as part of the user interface display provided at step 217. For example, in receiving the request for the test code results information from the developer computing device 140, the developer computing platform 120 may receive the request for the test code results information via a web dashboard provided as part of the user interface display on the developer computing device 140. Such a web dashboard may, for instance, be provided by testing environment computing platform 110 to the developer computing device 140 and/or may include one or more of the example user interfaces discussed above.

In some embodiments, receiving the test code results information from the developer computing platform 120 may include receiving a request for the test code results information via an application programming interface. For example, in receiving the request for the test code results information from the developer computing device 140, testing environment computing platform 110 and/or developer computing platform 120 may receive the request for the test results information via an application programming interface. For instance, such an application programming interface may expose one or more functions provided by testing environment computing platform 110 to other applications on other devices, such as developer computing device 140, and an application executing on developer computing device 140 may utilize one or more function calls provided by the application programming interface to request the test code results information.

At step 219, the developer computing device 140 may receive one or more updates or modification to the test code that as previously executed on the testing environment computing platform 110. In some examples, the updates to the test code received at step 219 may be response to error information received as part of the test code results received at step 218. In some instance, the code update received at step 219 may be the result of external changes to the code that are unrelated to information obtained in the previous execution of the test code. In some instances, the code updates received at step 219 may include modifications to how data is used or read into the code, based on test code results obtained during the previous test code execution and using actual data, e.g., pulled in from the enterprise data storage platform 130.

At step 220, the developer computing device 140 may send the updated test code and a test code execution request to the developer computing platform 120. Subsequently, testing environment computing platform 110 may repeat one or more steps of the example event sequence discussed above in conducting software testing using dynamically masked data. Additionally or alternatively, testing environment computing platform 110 may initiate one or more additional software testing executions, similar to how testing environment computing platform 110 may initiate such processes and generate and send related results in the examples described above.

Figure 7:
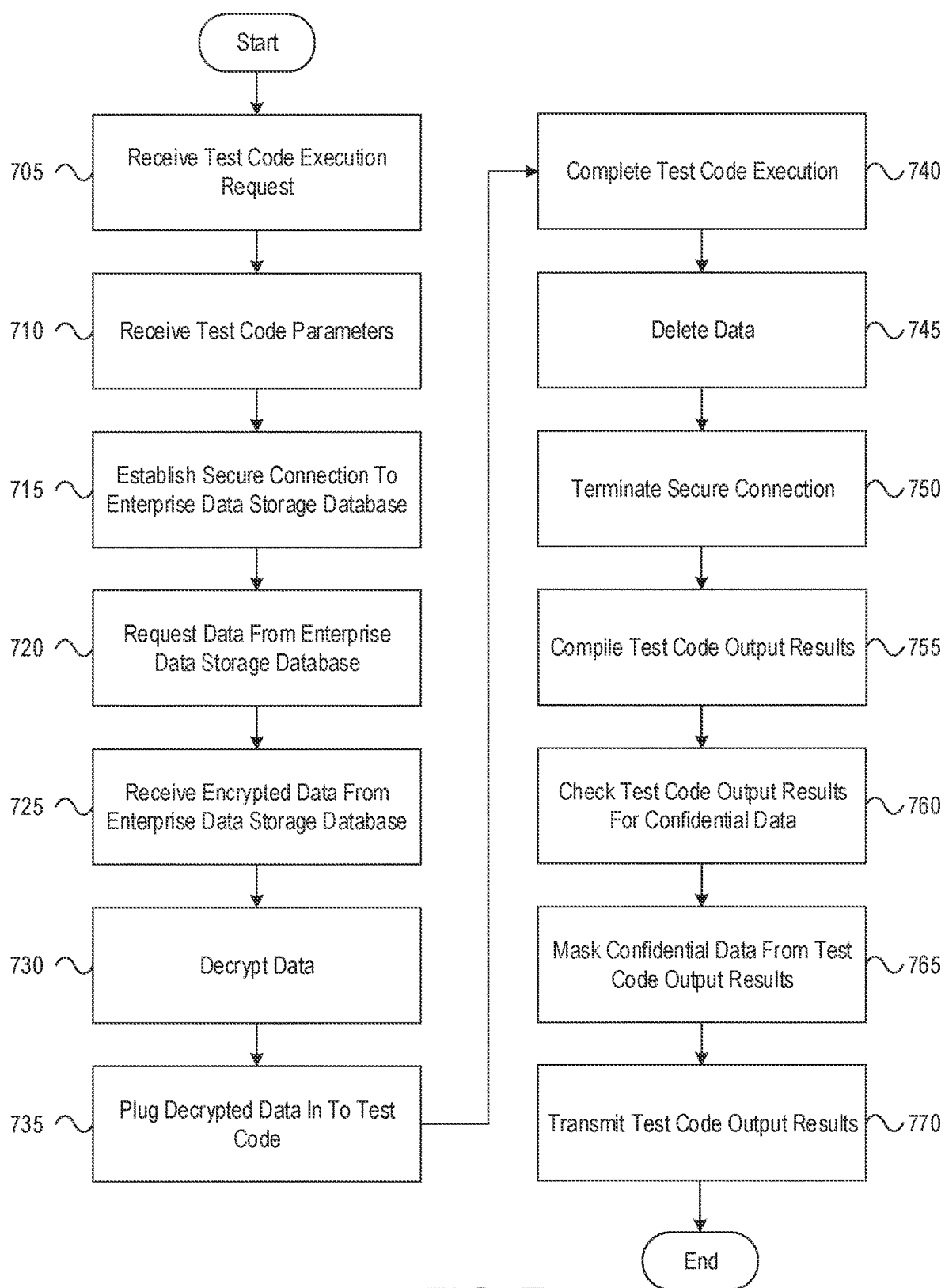
FIG. 7 depicts an illustrative method for conducting software testing using dynamically masked data in accordance with one or more example embodiments.

FIG. 7 depicts an illustrative method for conducting software testing using dynamically masked data in accordance with one or more example embodiments. Referring to FIG. 7, at step 705, a computing platform having at least one processor, a communication interface, and memory may receive a test code execution request from a developer computing platform or a developer computing device. The test code execution request may include a test code for execution. At step 710, the computing platform may receive one or more parameters related to execution of the test code. The one or more parameters may include as least one of: a programming language, a framework, a programming dependency, a relying subsystem, a cache parameter, or a container environment. At step 715, the computing platform may establish a secure connection to an enterprise data storage database.

At step 720, upon initiating the execution of the test code and establishing the secure connection to the enterprise data storage database, the computing platform may request data, such as confidential data, from the enterprise data storage database, in connection with the test execution request. In some instances, executing the test code may include building and compiling the test code on the computing platform based on information received from the developer computing platform at steps 705 and 710. Executing the test code may then include executing the test code on a selected trusted execution environment, where the selected trusted execution environment may be received from the developer computing platform previously, e.g., as part of step 710. In some instances, requesting confidential data from the enterprise data storage database may include generating a request for confidential information upon receiving the test execution request at step 705. Responsive to the request, at step 725, the computing platform may receive encrypted data from the enterprise data storage database, e.g., including confidential data. Receiving the encrypted confidential data at step 725 may include compiling, by the enterprise data storage database, confidential data for transmission and encrypting the confidential data upon being transmitted by the enterprise data storage database. At step 730, the computing platform may decrypt the data received from the enterprise data storage database. At step 735, the computing platform may plug the decrypted data into the test code as applicable.

At step 740, the computing platform may complete execution of the test code. Upon completing the test code execution, at step 745, the computing platform may delete the data that was received from the enterprise data storage database. At step 750, the computing platform may delete the secure connection to the enterprise data storage database. At step 755, the computing platform may compile test code output results. At step 760, the computing platform may check the test code output results for confidential data, e.g., by performing a confidential data verification check. Upon identifying the presence of confidential data in the test code output results, at step 765, the computing platform may mask the confidential data that is present in the test code output results. Subsequently, as step 770, the computing platform may transmit, via the communication interface, the test code output results to one or more developer computing devices or platforms. Sending the test code output results may include providing a user interface display on a computing device associated with the developer computing platform. The user interface display may include information related to the test code output results.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish a secure connection to an enterprise data storage database;
   upon establishing the secure connection, request confidential data from the enterprise data storage database in connection a test code execution request;
   execute a test code associated with the test code execution request, wherein executing the test code using the confidential data;
   upon completing execution of the test code, delete the confidential data from the computing platform;
   terminate the secure connection to the enterprise data storage database;
   perform a confidential data verification check on test code output results;
   upon detecting confidential data in the test code output results, masking the confidential data in the test code output results to create masked test code output results, wherein masking the confidential data includes training a machine learning classification model to the test code output results to identify components of confidential data and generating a pseudo-real dataset using the machine learning classification model to replace components of confidential data and create masked test code output results; and send, via the communication interface, to a developer computing platform, masked test code output results.

2. The computing platform of claim 1, wherein executing the test code includes receiving encrypted confidential data from the enterprise data storage database, decrypting the confidential data, and plugging the confidential data into the test code.

3. The computing platform of claim 1, wherein establishing the secure connection to the enterprise data storage database occurs upon receiving, via the communication interface, the test code execution request from a developer computing platform.

4. The computing platform of claim 3, wherein receiving the test code execution request includes receiving one or more parameters for executing the test code, and wherein the one or more parameters include as least one of: a programming language, a framework, a programming dependency, a relying subsystem, a cache parameter, or a container environment.

5. The computing platform of claim 1, wherein executing the test code includes building and compiling the test code on the computing platform based on information received from the developer computing platform.

6. The computing platform of claim 1, wherein requesting confidential data from the enterprise data storage database includes generating a request for confidential information associated with the code test execution request.

7. The computing platform of claim 1, wherein executing the test code includes compiling, by the enterprise data storage database, confidential data for transmission, encrypting the confidential data upon being transmitted by the enterprise data storage database, decrypting the confidential data upon being received by the computing, and plugging the confidential data into the test code.

8. The computing platform of claim 1, wherein the memory stores additional computer-readable instructions that, when executed by the at least one processor, cause the computing platform to receive a selected trusted execution environment, and wherein executing the test code includes executing the test code on the selected trusted execution environment.

9. The computing platform of claim 1, wherein sending the test code output results includes compiling error information.

10. The computing platform of claim 1, wherein sending the masked test code output results includes providing a user interface display on a computing device associated with the developer computing platform, and wherein the user interface display includes information related to the masked test code output results.

11. A method, comprising:
at a computing platform comprising at least one processor, a communication interface, and memory:
establishing a secure connection to an enterprise data storage database;
upon establishing the secure connection, requesting confidential data from the enterprise data storage database in connection a test code execution request;
executing a test code associated with the test code execution request;
upon completing execution of the test code, deleting the confidential data from the computing platform;
performing a confidential data verification check on test code output results;
upon detecting confidential data in the test code output results, masking the confidential data in the test code output results to create masked test code output results wherein masking the confidential data includes training a machine learning classification model to the test code output results to identify components of confidential data and generating a pseudo-real dataset using the machine learning classification model to replace components of confidential data and create masked test code output results; and
sending, via the communication interface, to a developer computing platform, masked test code output results.

12. The method of claim 11, wherein executing the test code includes receiving encrypted confidential data from the enterprise data storage database, decrypting the confidential data, and plugging the confidential data into the test code.

13. The method of claim 11, wherein establishing the secure connection to the enterprise data storage database occurs upon receiving, via the communication interface, the test code execution request from a developer computing platform.

14. The method of claim 13, wherein receiving the test code execution request includes receiving one or more parameters for executing the test code.

15. The method of claim 11, wherein executing the test code includes building and compiling the test code on the computing platform based on information received from the developer computing platform.

16. The method of claim 11, wherein executing the test code includes compiling, by the enterprise data storage database, confidential data for transmission, encrypting the confidential data upon being transmitted by the enterprise data storage database, decrypting the confidential data upon being received by the computing, and plugging the confidential data into the test code.

17. The method of claim 11, wherein sending the test code output results includes compiling error information.

18. The method of claim 11, wherein sending the masked test code output results includes providing a user interface display on a computing device associated with the developer computing platform, and wherein the user interface display includes information related to the masked test code output results.

19. The method of claim 11, further comprising:
receiving a selected trusted execution environment,
wherein executing the test code includes executing the test code on the selected trusted execution environment.

20. One or more non-transitory computer-readable media storing instructions that, when executed by a computing platform comprising at least one processor, a communication interface, and memory, cause the computing platform to:
establish a secure connection to an enterprise data storage database;
upon establishing the secure connection, request confidential data from the enterprise data storage database in connection a test code execution request, wherein the test code execution request includes a test code for execution;
execute the test code using the confidential data;

upon completing execution of the test code, delete the confidential data from the computing platform perform a confidential data verification check on test code output results;

upon detecting confidential data in the test code output results, masking the confidential data in the test code output results to create masked test code output results, wherein masking the confidential data includes training a machine learning classification model to the test code output results to identify components of confidential data and generating a pseudo-real dataset using the machine learning classification model to replace components of confidential data and create masked test code output results; and send, via the communication interface, to a developer computing platform, masked test code output results.

* * * * *

UNITED STATES PATENT AND TRADEMARK OFFICE
CERTIFICATE OF CORRECTION

PATENT NO. : 11,822,467 B2
APPLICATION NO. : 17/713854
DATED : November 21, 2023
INVENTOR(S) : Lightowler et al.

It is certified that error appears in the above-identified patent and that said Letters Patent is hereby corrected as shown below:

In the Claims

Column 24, Claim 11, Line 8:
After "results", insert --,--

Column 25, Claim 20, Line 2:
After "platform", insert --;--

Signed and Sealed this
Twelfth Day of August, 2025

Coke Morgan Stewart
*Acting Director of the United States Patent and Trademark Office*